United States Patent
Lin et al.

(10) Patent No.: US 12,417,145 B2
(45) Date of Patent: Sep. 16, 2025

(54) DECODING PARAMETER UPDATING METHOD, MEMORY STORAGE DEVICE, AND MEMORY CONTROL CIRCUIT UNIT

(71) Applicant: PHISON ELECTRONICS CORP., Miaoli (TW)

(72) Inventors: Yu-Hsiang Lin, Yunlin County (TW); Shih-Jia Zeng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 50 days.

(21) Appl. No.: 18/624,125

(22) Filed: Apr. 2, 2024

(65) Prior Publication Data
US 2025/0265149 A1 Aug. 21, 2025

(30) Foreign Application Priority Data
Feb. 19, 2024 (TW) .................................. 113105705

(51) Int. Cl.
*G06F 11/10* (2006.01)
(52) U.S. Cl.
CPC ...... *G06F 11/1068* (2013.01); *G06F 11/1016* (2013.01)
(58) Field of Classification Search
None
See application file for complete search history.

(56) References Cited

U.S. PATENT DOCUMENTS

| | | | | |
|---|---|---|---|---|
| 8,683,297 B2 * | 3/2014 | Jeon | ...................... | G11C 16/349 714/769 |
| 2014/0026003 A1 * | 1/2014 | Chen | .................... | G11C 29/021 714/708 |
| 2015/0085573 A1 * | 3/2015 | Sharon | .................. | G06F 11/004 365/185.03 |
| 2017/0148510 A1 * | 5/2017 | Bazarsky | ............ | G11C 11/5642 |
| 2017/0271031 A1 * | 9/2017 | Sharon | .................... | G11C 29/52 |
| 2020/0183623 A1 * | 6/2020 | Lin | ...................... | G06F 12/0238 |
| 2021/0295942 A1 * | 9/2021 | Yamaki | ................ | G11C 29/028 |

(Continued)

OTHER PUBLICATIONS

M. Zhang et al., "RBER Aware Multi-Sensing for Improving Read Performance of 3D MLC NAND Flash Memory," in IEEE Access, vol. 6, pp. 61934-61947, 2018, (Year: 2018).*

(Continued)

*Primary Examiner* — Daniel F. McMahon
(74) *Attorney, Agent, or Firm* — JCIPRNET

(57) ABSTRACT

A decoding parameter updating method, a memory storage device, and a memory control circuit unit are provided. The method includes: sending a read command sequence to a rewritable non-volatile memory module to instruct to read first data from a first physical unit based on multiple read voltage levels; decoding the first data according to multiple decoding parameters to obtain second data, wherein the decoding parameters respectively correspond to multiple voltage intervals, and the voltage intervals are defined by the read voltage levels; obtaining first error evaluation information corresponding to a first voltage interval among the voltage intervals according to the first data and the second data; and updating a first decoding parameter corresponding to the first voltage interval according to the first error evaluation information.

27 Claims, 7 Drawing Sheets

(56) References Cited

U.S. PATENT DOCUMENTS

| | | | |
|---|---|---|---|
| 2023/0153198 A1* | 5/2023 | Huang | G06F 3/0679 |
| | | | 714/723 |
| 2023/0221873 A1* | 7/2023 | Chen | G11C 16/26 |
| | | | 711/103 |
| 2023/0297232 A1* | 9/2023 | Wang | G06F 3/0655 |
| | | | 711/206 |

OTHER PUBLICATIONS

B. Peleato, R. Agarwal, J. M. Cioffi, M. Qin and P. H. Siegel, "Adaptive Read Thresholds for NAND Flash," in IEEE Transactions on Communications, vol. 63, No. 9, pp. 3069-3081, Sep. 2015, (Year: 2015).*

* cited by examiner

| Voltage interval | 711 | 712 | 713 | 714 | 715 | 716 |
|---|---|---|---|---|---|---|
| HB | 1 | 1 | 1 | 0 | 0 | 0 |
| SB(1) | 1 | 1 | 0 | 0 | 1 | 1 |
| SB(2) | 1 | 0 | 0 | 0 | 0 | 1 |
| Memory cell number | N(1) | N(2) | N(3) | N(4) | N(5) | N(6) |
| Error bit number | E(1) | E(2) | E(3) | E(4) | E(5) | E(6) |
| BER | BER(1) | BER(2) | BER(3) | BER(4) | BER(5) | BER(6) |
| LLR | LLR(1) | LLR(2) | LLR(3) | LLR(4) | LLR(5) | LLR(6) |

DECODING PARAMETER UPDATING METHOD, MEMORY STORAGE DEVICE, AND MEMORY CONTROL CIRCUIT UNIT

CROSS-REFERENCE TO RELATED APPLICATION

This application claims the priority benefit of Taiwan application serial no. 113105705, filed on Feb. 19, 2024. The entirety of the above-mentioned patent application is hereby incorporated by reference herein and made a part of this specification.

BACKGROUND

Technical Field

The disclosure relates to a decoding parameter updating method, a memory storage device, and a memory control circuit unit.

Description of Related Art

Portable electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small volume, and no mechanical structure, the rewritable non-volatile memory module is very suitable for being built into various portable electronic devices exemplified above.

As the data storage density of the rewritable non-volatile memory module becomes higher and higher, the interference between memory cells in the rewritable non-volatile memory module also becomes more and more serious, which causes data read from the rewritable non-volatile memory module to be also more prone to errors. Generally speaking, when the bit error rate (BER) of the read data is high, a memory controller may try to improve the decoding success rate of the data through a soft decode mode. However, if decoding parameters adopted by a decoding circuit in the memory controller is inappropriate, it will be difficult for the decoding circuit to successfully decode the data regardless of whether the soft decode mode is entered.

SUMMARY

The disclosure provides a decoding parameter updating method, a memory storage device, and a memory control circuit unit, which can improve the decoding success rate of data.

An exemplary embodiment of the disclosure provides a decoding parameter updating method, which is used for a rewritable non-volatile memory module. The rewritable non-volatile memory module includes multiple physical units, and the decoding parameter updating method includes the following steps. At least one read command sequence is sent to the rewritable non-volatile memory module to instruct to read first data from a first physical unit among the physical units based on multiple read voltage levels. The first data is decoded according to multiple decoding parameters to obtain second data after reading the first data from the first physical unit. The decoding parameters respectively correspond to multiple voltage intervals, and the voltage intervals are defined by the read voltage levels. First error evaluation information corresponding to a first voltage interval among the voltage intervals is obtained according to the first data and the second data. A first decoding parameter corresponding to the first voltage interval among the decoding parameters is updated according to the first error evaluation information.

An exemplary embodiment of the disclosure further provides a memory storage device, which includes a connection interface unit, a rewritable non-volatile memory module, and a memory control circuit unit. The connection interface unit is used to couple to a host system. The rewritable non-volatile memory module includes multiple physical units. The memory control circuit unit is coupled to the connection interface unit and the rewritable non-volatile memory module. The memory control circuit unit is used to perform the following operations. At least one read command sequence is sent to the rewritable non-volatile memory module to instruct to read first data from a first physical unit among the physical units based on multiple read voltage levels. The first data is decoded according to multiple decoding parameters to obtain second data after reading the first data from the first physical unit. The decoding parameters respectively correspond to multiple voltage intervals, and the voltage intervals are defined by the read voltage levels. First error evaluation information corresponding to a first voltage interval among the voltage intervals is obtained according to the first data and the second data. A first decoding parameter corresponding to the first voltage interval among the decoding parameters is updated according to the first error evaluation information.

An exemplary embodiment of the disclosure further provides a memory control circuit unit, which is used to control a rewritable non-volatile memory module. The rewritable non-volatile memory module includes multiple physical units. The memory control circuit unit includes a host interface, a memory interface, a decoding circuit, and a memory management circuit. The host interface is used to couple to a host system. The memory interface is used to couple to the rewritable non-volatile memory module. The memory management circuit is coupled to the host interface, the memory interface, and the decoding circuit. The memory management circuit is used to send at least one read command sequence to the rewritable non-volatile memory module to instruct to read first data from a first physical unit among the physical units based on multiple read voltage levels. The decoding circuit is used to decode the first data according to multiple decoding parameters to obtain second data after reading the first data from the first physical unit. The decoding parameters respectively correspond to multiple voltage intervals, and the voltage intervals are defined by the read voltage levels. The memory management circuit is further used to obtain first error evaluation information corresponding to a first voltage interval among the voltage intervals according to the first data and the second data. The memory management circuit is further used to update a first decoding parameter corresponding to the first voltage interval among the decoding parameters according to the first error evaluation information.

Based on the above, after reading the first data from the first physical unit based on the read voltage levels, the decoding parameters corresponding to different voltage intervals may be used to decode the first data to obtain the second data. Thereafter, according to the first data and the second data, the first error evaluation information corresponding to the first voltage interval may be obtained and used to update the first decoding parameter corresponding to the first voltage interval among the decoding parameters. In this way, the decoding success rate of data read from the first physical unit can be improved in the future. In addition, the updating efficiency of the first decoding parameter can be effectively improved without increasing the system burden as much as possible.

DESCRIPTION OF THE EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
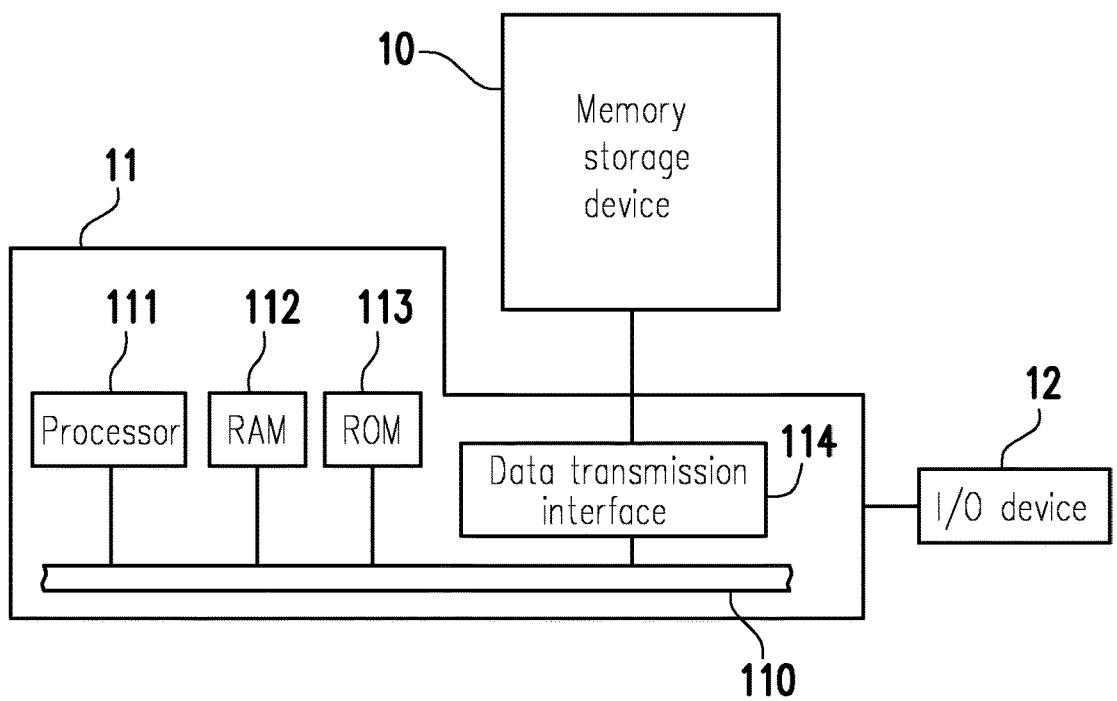
FIG. 1 is a schematic diagram of a host system, a memory storage device, and an input/output (I/O) device according to an exemplary embodiment of the disclosure.
Figure 2:
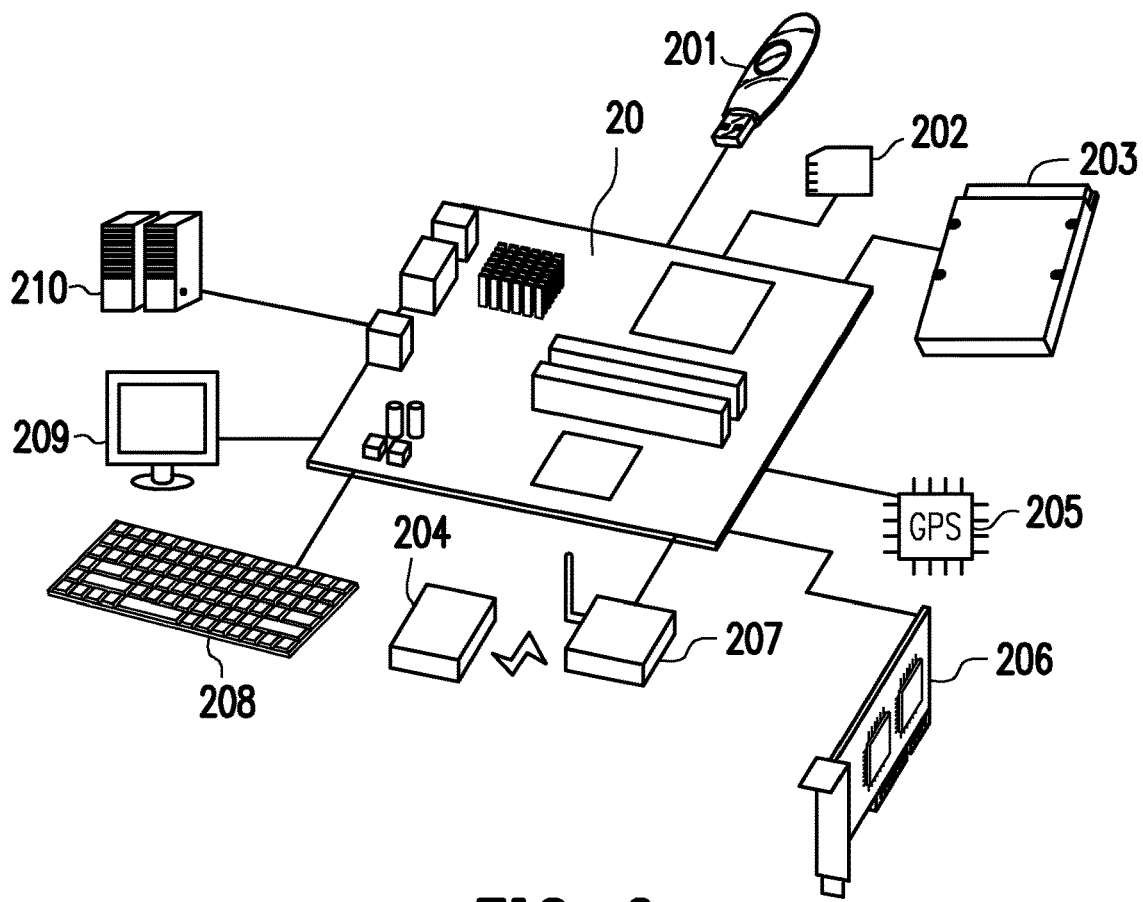
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data in the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a WiFi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
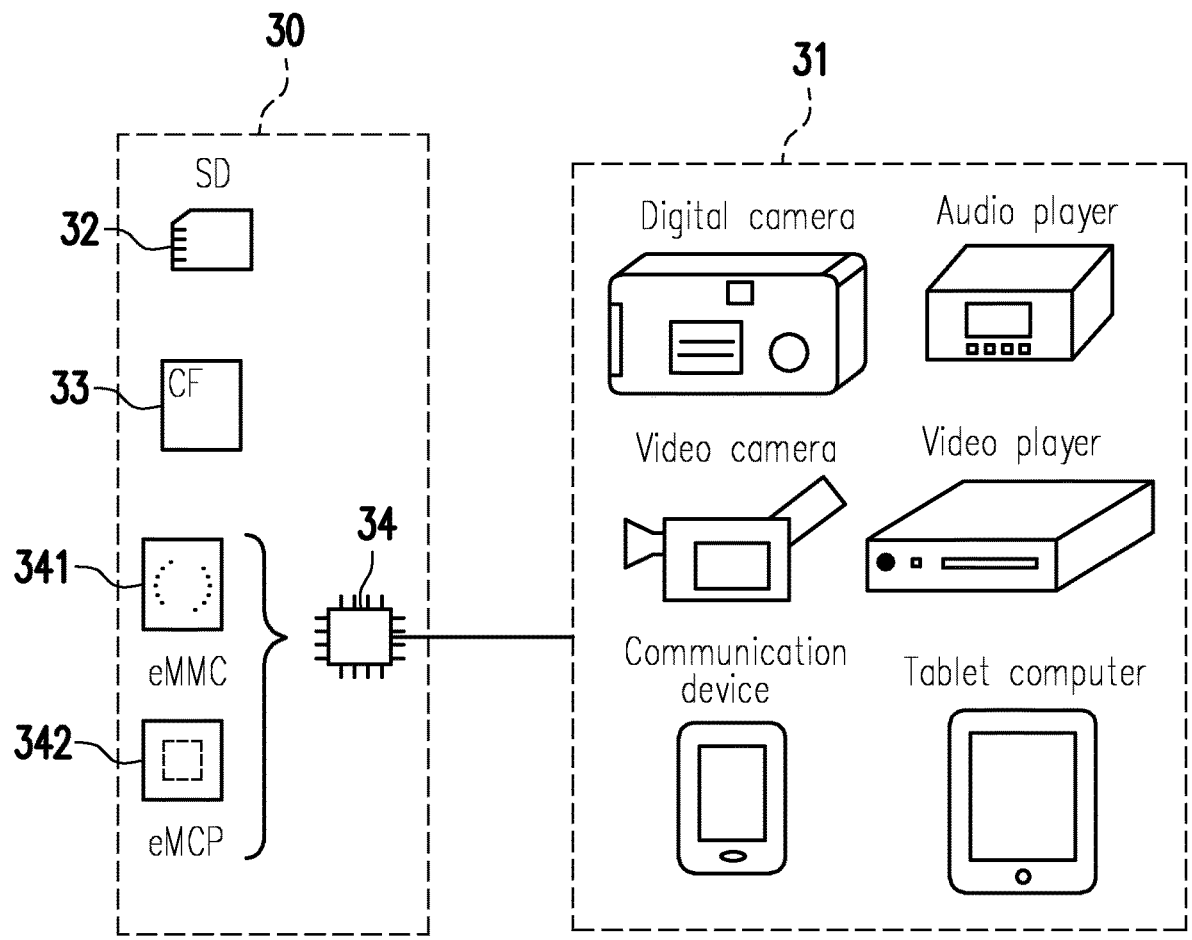
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
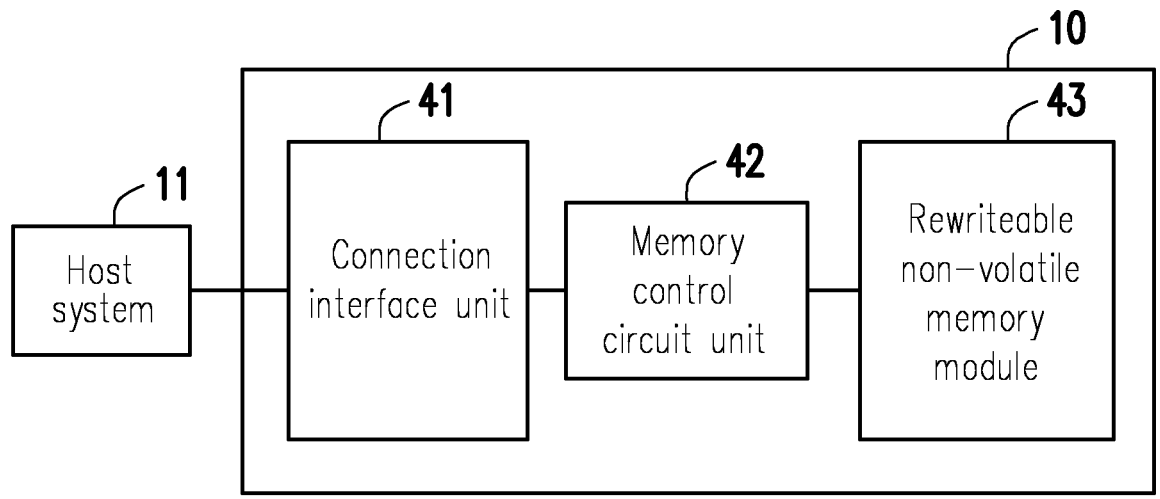
FIG. 4 is a schematic diagram of a memory storage device according to an exemplary embodiment of the disclosure.

FIG. 4 is a schematic diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is used to couple to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell in the rewritable non-volatile memory module 43 has multiple storage states. Through applying a read voltage, which storage state a memory cell belongs to may be judged, so as to acquire one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If one memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
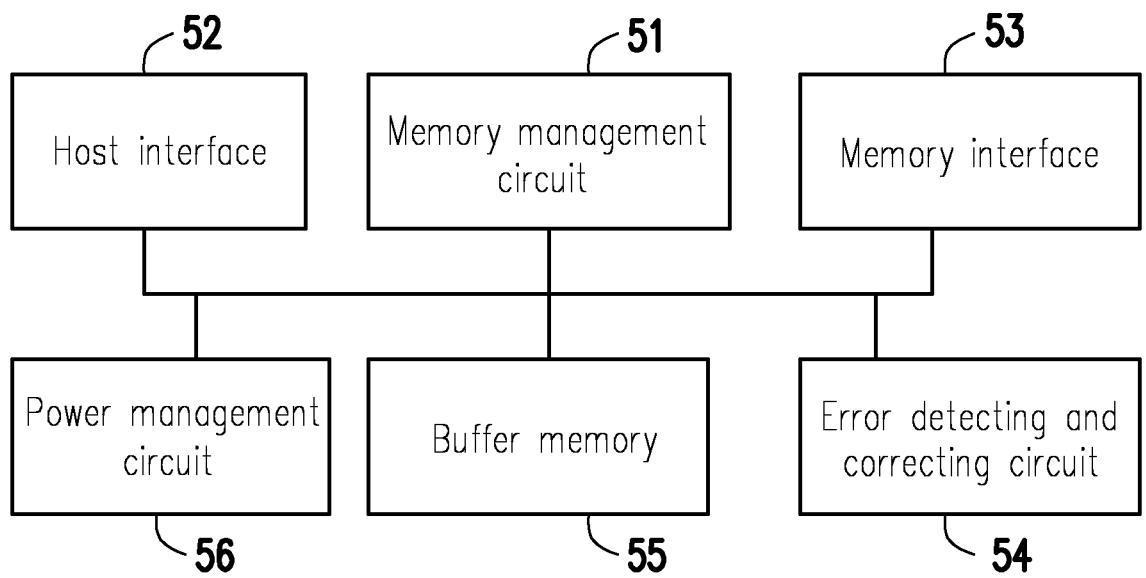
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the descriptions of the operations of the memory control circuit unit 42 and the memory storage device 10.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored in a specific region (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data into the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written into the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to acquire and identify commands and data of the host system 11. For example, the commands and the data of the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written into the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (such as changing a read voltage level and executing a garbage collection (GC) operation). The command sequences are, for example, generated by the memory management circuit 51 and sent to the rewritable non-volatile memory module 43 through the memory interface 53. The command sequences may include one or more signals or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to execute an error detecting and correcting operation to ensure correctness of data. Specifically, when the memory management circuit 51 acquires a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code into the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 executes the error detecting and correcting operation on the read data according to the error correcting code and/or the error detecting code. For example, the error detecting and correcting circuit 54 may adopt a low density parity check (LDPC) code or other types of encoding/decoding algorithms to execute data encoding and decoding.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
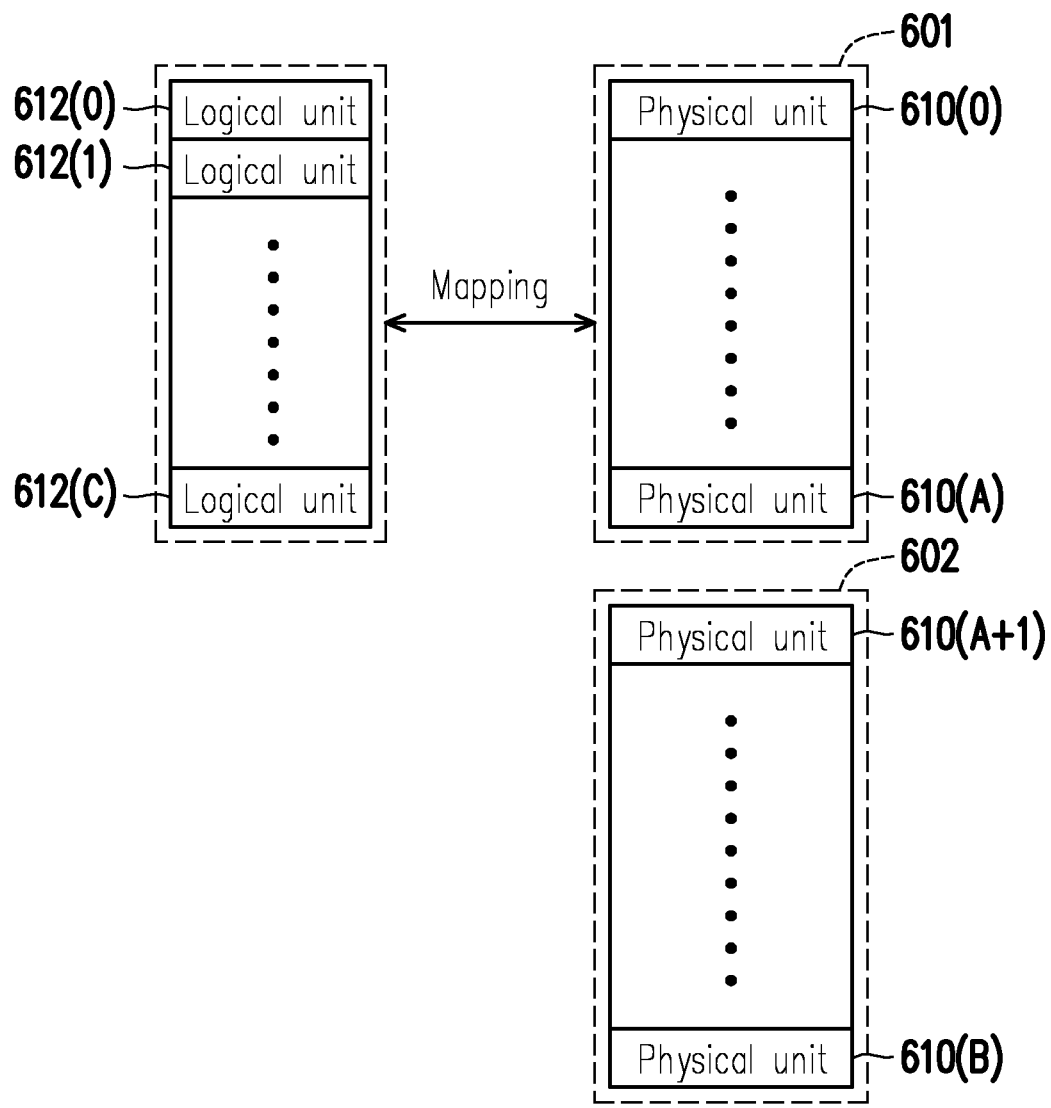
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a spare area 602.

In an exemplary embodiment, a physical unit refers to a physical address or a physical programing unit. In an exemplary embodiment, a physical unit may also be composed of multiple continuous or discontinuous physical addresses. In an exemplary embodiment, a physical unit may also refer to a virtual block (VB). A virtual block may include multiple physical addresses or multiple physical programming units. In an exemplary embodiment, a virtual block may include one or more physical erasing units.

In an exemplary embodiment, the physical units 610(0) to 610(A) in the storage area 601 are used to store user data (for example, the user data from the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or physical units that do not store valid data) in the spare area 602 may be erased. When writing new data, one or more physical units may be extracted from the spare area 602 to store the new data. In an exemplary embodiment, the spare area 602 is also referred to as a free pool.

In an exemplary embodiment, the memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or be composed of multiple continuous or discontinuous logical addresses.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

In an exemplary embodiment, the memory management circuit 51 may record management data (also referred to as logical-to-physical mapping information) describing a mapping relationship between a logical unit and a physical unit in at least one logical-to-physical mapping table. When the host system 11 intends to read data from the memory storage device 10 or write data into the memory storage device 10, the memory management circuit 51 may access the rewritable non-volatile memory module 43 according to information in the logical-to-physical mapping table.

In an exemplary embodiment, after reading data from a physical unit (also referred to as a first physical unit) in the rewritable non-volatile memory module 43, the error detecting and correcting circuit 54 may decode the data to try to correct errors in the data. Generally speaking, if the bit error rate (BER) of the data read from the first physical unit is not high, the error detecting and correcting circuit 54 may decode the data based on a hard decode mode to try to quickly correct the few errors in the data. However, if the bit error rate of the data read from the first physical unit is high, the error detecting and correcting circuit 54 may instead decode the data based on a soft decode mode to try to improve the decoding success rate of the data (that is, to improve the probability of successfully correcting all the errors in the data).

It should be noted that in the hard decode mode, the memory management circuit 51 only needs to read a hard bit corresponding to each memory cell from the first physical unit, and the error detecting and correcting circuit 54 may execute a decoding operation according to the obtained hard bit. However, in the soft decode mode, the memory management circuit 51 needs to read one hard bit and multiple soft bits corresponding to a single memory cell from the first physical unit at the same time, and the error detecting and correcting circuit 54 may then execute the decoding operation according to the obtained hard bit and soft bits. In other words, compared with the hard decode mode, in the soft decode mode, the memory management circuit 51 needs to read more data (that is, the soft bits) from the rewritable non-volatile memory module 43 to assist decoding, thereby improving the decoding success rate of the data.

Figure 7:
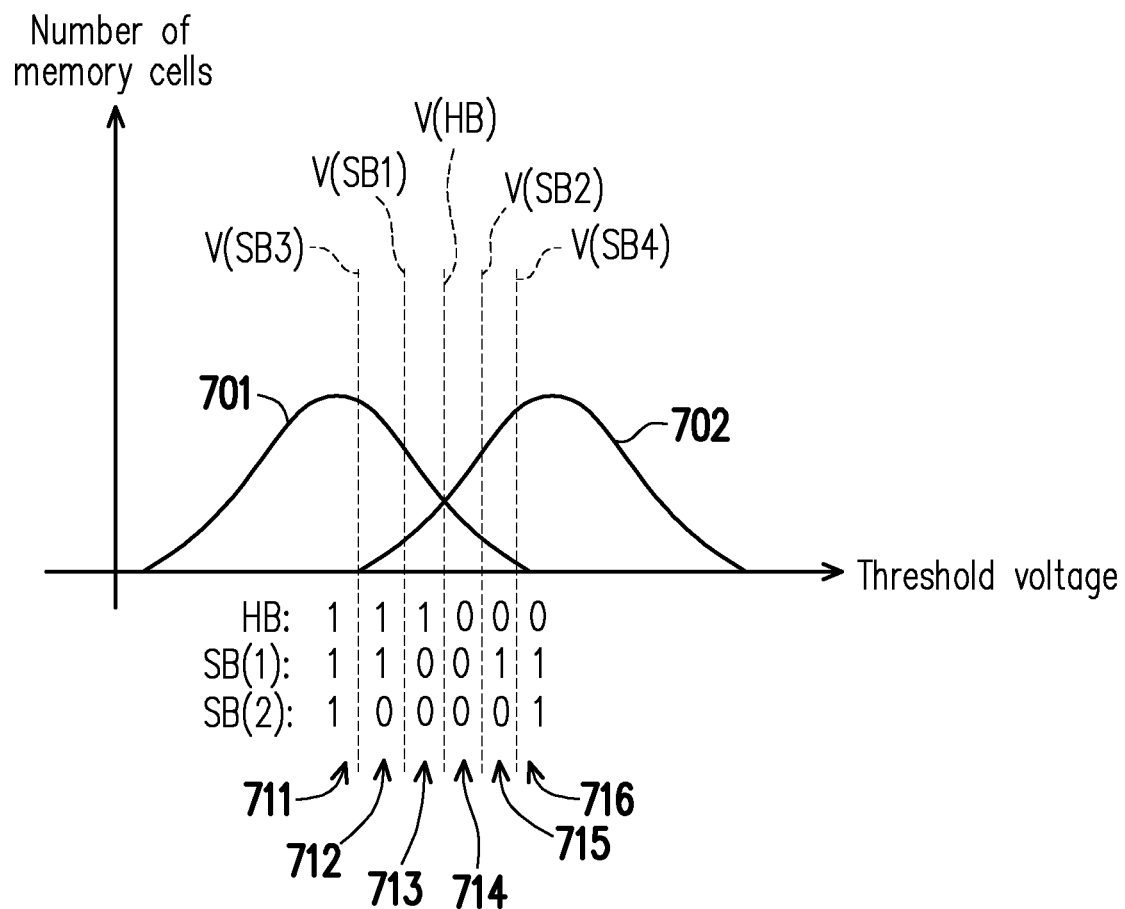
FIG. 7 is a schematic diagram of a threshold voltage distribution of a first physical unit and reading the first physical unit using multiple read voltage levels according to an exemplary embodiment of the disclosure.

FIG. 7 is a schematic diagram of a threshold voltage distribution of a first physical unit and reading the first physical unit using multiple read voltage levels according to an exemplary embodiment of the disclosure. Please refer to FIG. 7. It is assumed that the first physical unit includes multiple memory cells, and the threshold voltage distribution of the memory cells includes states 701 and 702. For example, the state 701 corresponds to bit "1" and the state 702 corresponds to bit "0". In other words, if the threshold voltage of a certain memory cell belongs to the state 701, it means that the memory cell is used to store bit "1". If the threshold voltage of a certain memory cell belongs to the state 702, it means that the memory cell is used to store bit "0". It should be noted that the states 701 and 702 may also correspond to other bits or bit combinations, which are not limited by the disclosure.

It should be noted that as the degree of usage (or the degree of loss) of the first physical unit increases and/or an environmental temperature change becomes greater, an overlapping region between the states 701 and 702 may gradually expand. At this time, a judgment result of whether a certain memory cell belongs to the state 701 or 702 may gradually become inaccurate. For example, after applying a read voltage level V(HB) to the first physical unit, the threshold voltage of a certain memory cell belonging to the state 701 by default may be greater than the read voltage level V(HB), so a bit stored in the memory cell may be misjudged as bit "0" (that is, the bit corresponding to the state 702). Alternatively, after applying the read voltage level V(HB) to the first physical unit, the threshold voltage of a certain memory cell belonging to the state 702 by default may be less than the read voltage level V(HB), so a bit stored in the memory cell may be misjudged as bit "1" (that is, the bit corresponding to the state 701). In this case, the data read from the first physical unit may contain a large number of error bits, and the total number of the error bits may even exceed the maximum number of error bits that may be corrected in the hard decode mode. In this case, the error detecting and correcting circuit 54 may instead decode the data based on the soft decode mode to improve the decoding success rate of the data.

In an exemplary embodiment, in the soft decode mode, the memory management circuit 51 may send at least one read command sequence to the rewritable non-volatile memory module 43. The read command sequences may be used to instruct the rewritable non-volatile memory module 43 to read data (also referred to as first data) from the first physical unit based on multiple read voltage levels. For example, the read voltage levels may include read voltage levels V(HB) and V(SB1) to V(SB4) in FIG. 7. The first data may include bits HB, SB(1), and SB(2) in FIG. 7. For example, the bit HB is a hard bit, and the bits SB(1) and SB(2) are soft bits.

In an exemplary embodiment, through sequentially applying the read voltage levels V(HB) and V(SB1) to V(SB4) to a certain memory cell in the rewritable non-volatile memory module 43, the rewritable non-volatile memory module 43 may return the bits HB, SB(1), and SB(2) to the memory management circuit 51 according to a reading result of the memory cell. The bit HB may reflect the reading result of the memory cell using the read voltage level V(HB). For example, in response to the threshold voltage of a certain memory cell being lower than the read voltage level V(HB), the rewritable non-volatile memory module 43 may return the bit HB with a bit value of "1" to the memory management circuit 51. Alternatively, in response to the threshold voltage of a certain memory cell being higher than the read voltage level V(HB), the rewritable non-volatile memory module 43 may return the bit HB with a bit value of "0" to the memory management circuit 51. By analogy, the bits SB(1) and SB(2) may reflect a reading result of the memory cell using the read voltage levels V(SB1) to V(SB4).

In an exemplary embodiment, the read voltage levels V(SB1) to V(SB4) may define multiple voltage intervals 711 to 716. For example, the voltage interval 712 is between the read voltage levels V(SB1) and V(SB3), and so on. In an exemplary embodiment, the bits HB, SB(1), and SB(2) obtained through reading a certain memory cell may reflect that the threshold voltage of the memory cell is located in one of the voltage intervals 711 to 716. For example, assuming that the bits HB, SB(1), and SB(2) obtained through reading a certain memory cell are "110", it means that the threshold voltage of the memory cell is located in the voltage interval 712. Alternatively, assuming that the bits HB, SB(1), and SB(2) obtained through reading a certain memory cell are "011", it means that the threshold voltage of the memory cell is located in the voltage interval 716, and so on. It should be noted that the total number of the read voltage levels V(SB1) to V(SB4) and the total number of the voltage intervals 711 to 716 may be adjusted according to practical requirements and are not limited by the disclosure.

In an exemplary embodiment, after reading the first data from the first physical unit, in the soft decode mode, the error detecting and correcting circuit 54 may decode the first data according to multiple decoding parameters to obtain another data (also referred to as second data). The second data refers to data generated by the error detecting and correcting circuit 54 successfully decoding the first data (that is, the error detecting and correcting circuit 54 successfully correcting all error bits in the first data). In other words, after the first data is input to the error detecting and correcting circuit 54 for decoding (that is, trying to correct at least one error bit in the first data), if the first data may be successfully decoded (that is, all the error bits in the first data are corrected), the error detecting and correcting circuit 54 may output the second data. In other words, the second data may include the first data with the error bits being corrected. However, in an exemplary embodiment, if the error detecting and correcting circuit 54 fails to decode the first data (that is, the error detecting and correcting circuit 54 cannot correct all the error bits in the first data), the second data may not be generated or obtained.

In an exemplary embodiment, the decoding parameters respectively correspond to multiple voltage intervals, and the voltage intervals are defined by the read voltage levels. Taking FIG. 7 as an example, the decoding parameters may respectively correspond to the voltage intervals 711 to 716. That is, each voltage interval among the voltage intervals 711 to 716 corresponds to one decoding parameter. Taking the voltage interval 711 as an example, the decoding parameter corresponding to the voltage interval 711 may be dedicated to decoding data read from at least one memory cell with the threshold voltage located in the voltage interval 711 in the first physical unit. Alternatively, taking the voltage interval 712 as an example, the decoding parameter corresponding to the voltage interval 712 may be dedicated to decoding data read from at least one memory cell with the threshold voltage located in the voltage interval 712 in the first physical unit, and so on.

In an exemplary embodiment, assuming that the error detecting and correcting circuit 54 uses a low density parity check code to encode and decode data, the decoding parameter may include a log likelihood ratio (LLR). However, in an exemplary embodiment, if the error detecting and correcting circuit 54 uses other types of encoding/decoding algorithms to execute data encoding and decoding, the decoding parameter may include other types of parameters and is not limited to including the log likelihood ratio.

In an exemplary embodiment, during a period of decoding the first data, the first data may be synchronously saved in the buffer memory 55. After obtaining the second data, the memory management circuit 51 may obtain error evaluation information (also referred to as first error evaluation information) corresponding to a specific voltage interval (also referred to as a first voltage interval) among the voltage intervals according to the first data and the second data in the buffer memory 55. Then, the memory management circuit 51 may update a decoding parameter (also referred to as a first decoding parameter) corresponding to the first voltage interval among the decoding parameters according to the first error evaluation information. In an exemplary embodiment, the first decoding parameter may be dedicated to decoding data (also referred to as target data) read from multiple memory cells (also referred to as first memory cells) in the first physical unit. The threshold voltages of the first memory cells are all located in the first voltage interval.

In an exemplary embodiment, taking FIG. 7 as an example, the first voltage interval may be any one of the voltage intervals 711 to 716. Taking the voltage interval 713 as an example of the first voltage interval, the first decoding parameter may correspond to the voltage interval 713, and the first decoding parameter may be dedicated to decoding data (that is, the target data) read from at least one memory cell (that is, the first memory cell) with the threshold voltage located in the voltage interval 713 in the first physical unit, and so on.

In an exemplary embodiment, the first data may include the target data, and the first error evaluation information may reflect the total number of at least one error bit in the target data. For example, the error bit in the target data may be obtained through decoding the target data (that is, the first data). Alternatively, in an exemplary embodiment, the first error evaluation information may also reflect the bit error rate of the target data.

In an exemplary embodiment, the first data includes a data sequence (also referred to as a first data sequence), and the second data may include a data sequence (also referred to as a second data sequence). The memory management circuit 51 may perform a logical operation on the first data sequence and the second data sequence. For example, the logical operation may include an exclusive OR (XOR) operation or other types of logical operations, which are not limited by the disclosure. The memory management circuit 51 may obtain the first error evaluation information according to a result of the logical operation. For example, the result of the logical operation may reflect a position of at least one error bit in the first data sequence. In an exemplary embodiment, according to the result of the logical operation, the memory management circuit 51 may obtain the total number of at least one error bit in the target data and/or the bit error rate of the target data.

Figures 8, 9:
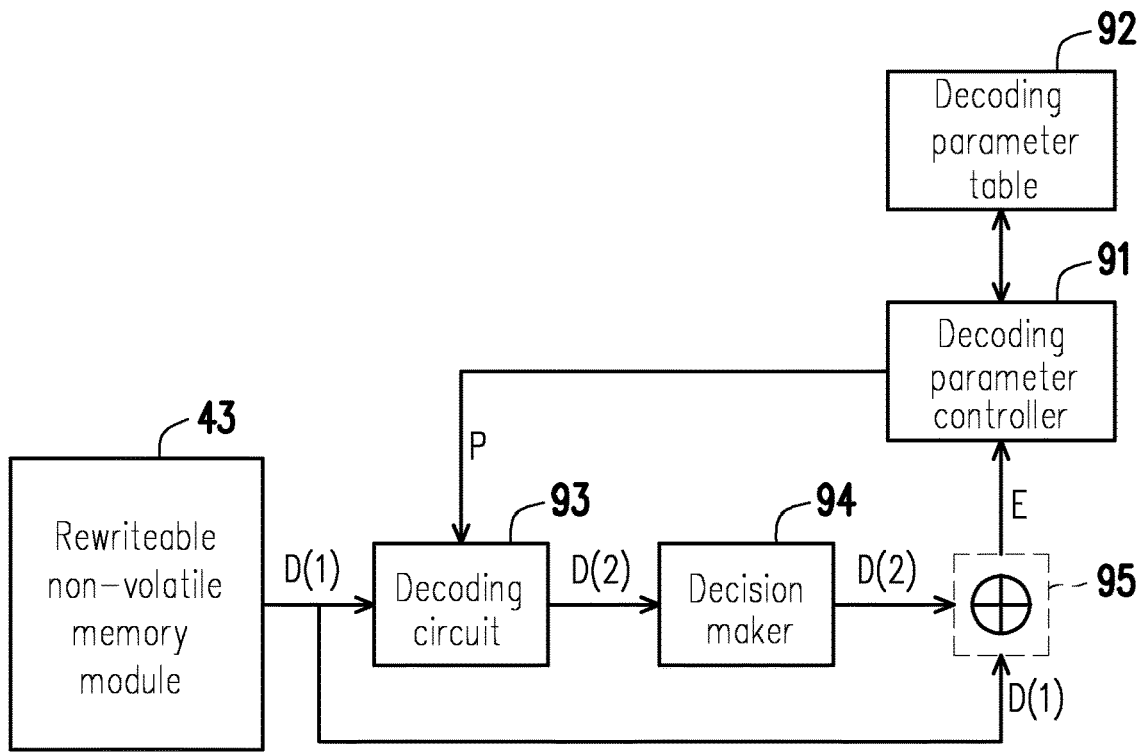
FIG. 8 is a schematic diagram of a data table according to an exemplary embodiment of the disclosure.
FIG. 9 is a schematic diagram of an updating system of a first decoding parameter according to an exemplary embodiment of the disclosure.

FIG. 8 is a schematic diagram of a data table according to an exemplary embodiment of the disclosure. Please refer to FIG. 8. A data table 81 may be used to store various transient data used in an operation of updating the first decoding parameter. For example, the data table 81 may be used to record representative bits (that is, the bits HB, SB(1), and SB(2)) corresponding to each voltage interval (including the first voltage interval), memory cell numbers N(1) to N(6), error bit numbers E(1) to E(6), bit error rates BER(1) to BER(6), and decoding parameters LLR(1) to LLR(6). For example, in an exemplary embodiment, LLR(1) to LLR(6) may be "−6.5", "−2.7", "−0.7", "0.7", "2.7", and "6.5", but the disclosure is not limited thereto. It should be noted that in the exemplary embodiment of FIG. 8, the log likelihood ratio (LLR) is used as an example of the decoding parameter, but the disclosure is not limited thereto.

In an exemplary embodiment, it is assumed that the voltage interval 711 is the first voltage interval. The memory cell number N(1) may reflect the total number of at least one memory cell (that is, the first memory cell) with the threshold voltage located in the voltage interval 711 in the first physical unit. The error bit number E(1) may reflect the total number of at least one error bit contained in the data (that is, the target data) read from the first memory cell in the first data. The bit error rate BER(1) may reflect the bit error rate of the target data. The decoding parameter LLR(1) is the decoding parameter (that is, the first decoding parameter) corresponding to the voltage interval 711 (that is, the first voltage interval).

In an exemplary embodiment, the memory management circuit 51 may update (or determine) a decoding parameter LLR(i) according to an error bit number E(i) and/or a bit error rate BER(i). In addition, the memory management circuit 51 may obtain the bit error rate BER(i) according to the error bit number E(i) and a memory cell number N(i).

In an exemplary embodiment, the memory management circuit 51 may calculate the decoding parameter LLR(i) (that is, the first decoding parameter) according to Equations (1.1) and (1.2) below.

$$LLR(i) = \ln(BER(i)/(1 - BER(i))) \qquad (1.1)$$

$$BER(i) = E(i)/N(i) \qquad (1.2)$$

In Equation (1.1), ln( ) represents a natural logarithm function. It should be noted that Equations (1.1) and (1.2) may also be adjusted according to practical requirements and are not limited by the disclosure.

In an exemplary embodiment, after obtaining the first error evaluation information, the memory management circuit 51 may also update another error evaluation information (also referred to as target error evaluation information) according to the first error evaluation information. The target error evaluation information may reflect a changing trend of the first error evaluation information within a period of time. For example, the target error evaluation information may reflect an average (or a weighted average) of the first error evaluation information corresponding to the first voltage interval obtained multiple times. The memory management circuit 51 may update the first decoding parameter according to the target error evaluation information.

In an exemplary embodiment, the memory management circuit 51 may obtain the target error evaluation information according to Equation (2.1) below.

$$BER(AVG) = \sum_{k=1}^{n} (W(k) \times BER(k))/n \qquad (2.1)$$

In Equation (2.1), BER(AVG) represents the target error evaluation information, BER(k) represents the first error evaluation information obtained at the $k^{th}$ time, W(k) is a weight parameter, and n may be any integer greater than 1.

In an exemplary embodiment, in Equation (1.1), the memory management circuit 51 may use BER(AVG) to replace BER(i) obtained once to calculate LLR(i). In addition, Equation (2.1) may also be adjusted according to practical requirements and is not limited by the disclosure. For example, in an exemplary embodiment, Equation (2.1) may also be adjusted in conjunction with an algorithm such as least mean square error, which is not limited by the disclosure.

In an exemplary embodiment, the memory management circuit 51 may also update the first decoding parameter according to the first error evaluation information and at least one environmental parameter. For example, the at least one environmental parameter includes at least one of a program count, an erase count, a read count, and a temperature value. The program count reflects the number of times the first physical unit (or any one or more physical units in the rewritable non-volatile memory module 43) is programmed. The erase count reflects the number of times the first physical unit (or any one or more physical units in the rewritable non-volatile memory module 43) is erased. The read count reflects the number of times the first physical unit (or any one or more physical units in the rewritable non-volatile memory module 43) is read. The temperature value reflects the temperature of the rewritable non-volatile memory module 43 (or the memory storage device 10). For example, under different operating environments, the memory management circuit 51 may adjust (such as increasing or decreasing) the finally determined first decoding parameter according to the at least one environmental parameter.

In an exemplary embodiment, the determined new first decoding parameter may directly overwrite or replace the old first decoding parameter. In an exemplary embodiment, the determined new first decoding parameter may be saved in a management table (for example, the management table 81 of FIG. 8) without overwriting or replacing the old first decoding parameter.

In an exemplary embodiment, the memory management circuit 51 may calculate a difference value between the new first decoding parameter and the old first decoding parameter through a least mean square error algorithm (or other algorithms). If the difference value is less than a threshold value, the memory management circuit 51 may use the new first decoding parameter to overwrite or replace the old first decoding parameter. However, if the difference value is greater than or equal to the threshold value, the memory management circuit 51 may store the new first decoding parameter in the management table without overwriting or replacing the old first decoding parameter. That is, in a case where a difference between the new first decoding parameter and the old first decoding parameter is large (that is, the difference value is greater than or equal to the threshold value), the new first decoding parameter and the old first decoding parameter may be both retained.

In an exemplary embodiment, the memory management circuit 51 may save multiple decoding parameters (also referred to as candidate decoding parameters) corresponding to the first voltage interval. For example, assuming that the first voltage interval is the voltage interval 711 of FIG. 7, the candidate decoding parameters all correspond to the voltage interval 711. When data read from any memory cell (that is, the first memory cell) with the threshold voltage located in the voltage interval 711 is to be decoded, one of the candidate decoding parameters may be selected and used to decode the data.

In an exemplary embodiment, at least one of the candidate decoding parameters corresponding to the first voltage interval may be updated through the obtained new first decoding parameter. For example, after obtaining the new first decoding parameter, the memory management circuit 51 may add the new first decoding parameter to the candidate decoding parameters to become a new candidate decoding parameter corresponding to the first voltage interval. Alternatively, the memory management circuit 51 may use the new first decoding parameter to replace or overwrite an old candidate decoding parameter among the candidate decoding parameters. Later, when the data read from the memory cell with the threshold voltage located in the first voltage interval needs to be decoded, the memory management circuit 51 may select an appropriate decoding parameter from the candidate decoding parameters corresponding to the first voltage interval according to a specific condition, and provide the decoding parameter to the error detecting and correcting circuit 54. The error detecting and correcting circuit 54 may use the decoding parameter to decode the data.

In an exemplary embodiment, the memory management circuit 51 may select the appropriate decoding parameter from the candidate decoding parameters according to the environmental parameter. For example, the memory management circuit 51 may select the appropriate decoding parameter from the candidate decoding parameters according to at least one of the program count, the erase count, the read count, and the temperature value corresponding to the first physical unit. For example, the memory management circuit 51 may select the appropriate decoding parameter from the candidate decoding parameters according to a value range of the environmental parameter. Then, the memory management circuit 51 may provide the decoding parameter to the error detecting and correcting circuit 54.

In an exemplary embodiment, the memory management circuit 51 may select the appropriate decoding parameter from the candidate decoding parameters corresponding to the first voltage interval according to offset information of the currently used read voltage level V(HB) (also referred to as a target read voltage). The offset information may reflect an offset of the target read voltage compared to a reference voltage. For example, assuming that the reference voltage is 3 volts and the target read voltage is 3.5 volts, the offset information may be "0.5" (that is, 3.5−3=0.5). The memory management circuit 51 may select the appropriate decoding parameter from the candidate decoding parameters according to the offset information (that is, "0.5") or the value range of the offset information. Then, the memory management circuit 51 may provide the decoding parameter to the error detecting and correcting circuit 54.

FIG. 9 is a schematic diagram of an updating system of a first decoding parameter according to an exemplary embodiment of the disclosure. Please refer to FIG. 9. In an exemplary embodiment, the updating system of the first decoding parameter may include a decoding parameter controller 91, a decoding parameter table 92, a decoding circuit 93, a decision maker 94, and a logical operator 95. The decoding parameter controller 91, the decoding parameter table 92, the decoding circuit 93, the decision maker 94, and the logical operator 95 may be implemented in the memory control circuit unit 42. For example, the decoding parameter controller 91, the decision maker 94, and the logical operator 95 may be implemented in the memory management circuit 51 in the form of hardware, firmware, or software. The decoding circuit 93 may be implemented in the error detecting and correcting circuit 54 in the form of hardware. The decoding parameter table 92 may be stored in the memory control circuit unit 42 or the rewritable non-volatile memory module 43.

In an exemplary embodiment, after reading data D(1) (that is, the first data) from the rewritable non-volatile memory module 43 based on multiple read voltage levels (for example, the read voltage levels V(HB) and V(SB1) to V(SB4) of FIG. 7), the decoding circuit 93 may decode the data D(1). If the decoding of the data D(1) is successful, the decoding circuit 93 may output data D(2) (that is, the second data). The decision maker 94 may judge whether the decoding of the data D(1) by the decoding circuit 93 is successful. If the decoding of the data D(1) is successful (that is, all error bits in the data D(1) are corrected), the decision maker 94 may input the data D(2) to the logical operator 95 and trigger (that is, activate) the logical operator 95. However, if the decoding of the data D(1) fails (that is, all the error bits in the data D(1) are not completely corrected), the decision maker 94 may not trigger the logical operator 95.

In an exemplary embodiment, after triggering the logical operator 95, the logical operator 95 may execute a logical operation (for example, the XOR operation) on a data sequence (that is, the first data sequence) in the data D(1) and a data sequence (that is, the second data sequence) in the data D(2) and output data E. The data E may reflect an operation result of the logical operation. For example, the data E may reflect a position of at least one error bit in the first data sequence (that is, which bits in the data D(1) are error bits).

In an exemplary embodiment, in a case where the lengths of the first data sequence and the second data sequence are the same, if a bit located at a certain position (also referred to as a target position) in the first data sequence is "1", but a bit also located at the target position in the second data sequence is "0", it means that the bit located at the target position in the first data sequence is an error bit. Alternatively, if a bit located at the target position in the first data sequence is "0", but a bit also located at the target position in the second data sequence is "1", it also means that the bit at the target position in the first data sequence is an error bit.

In an exemplary embodiment, the data E may include a data sequence (also referred to as a third data sequence). If a bit located at a specific position in the third data sequence is "1", it means that a bit also located at the specific position in the first data sequence is an error bit. Alternatively, if a bit located at a specific position in the third data sequence is "0", it means that a bit also located at the specific position in the first data sequence is not an error bit. It should be noted that the data E may also represent the position of at least one error bit in the first data sequence in other forms, which are not limited by the disclosure.

In an exemplary embodiment, the decoding parameter controller 91 may obtain the first error evaluation information according to the data E and update the first decoding parameter according to the first error evaluation information. The updated first decoding parameter may be stored in the decoding parameter table 92. When the decoding operation needs to be executed next time, the decoding parameter controller 91 may read a decoding parameter P from the decoding parameter table 92 and provide the decoding parameter P to the decoding circuit 93 for use. The relevant operation details of how to obtain the first error evaluation information and update the first decoding parameter according to the first error evaluation information have been detailed above and will not be repeated here.

In an exemplary embodiment, taking FIG. 7 and FIG. 8 as an example, in a subsequent soft decoding operation, according to data to be decoded being read from a memory cell belonging to which voltage interval among the voltage intervals 711 to 716, one of the decoding parameters LLR(1) to LLR(6) in the decoding parameter table 92 may be provided to the decoding circuit 93. For example, assuming that the data to be decoded is data read from a memory cell belonging to the voltage interval 711 in the first physical unit, the decoding parameter LLR(1) may be provided to the decoding circuit 93, and so on. In the soft decoding operation, the decoding circuit 93 may decode the data according to the received decoding parameter (for example, the decoding parameter LLR(i)). In an exemplary embodiment, the decoding parameter LLR(1) may be obtained through selecting one of multiple candidate decoding parameters corresponding to the voltage interval 711 and/or the decoding parameter LLR(2) may be obtained through selecting one of multiple candidate decoding parameters corresponding to the voltage interval 712, and so on.

In an exemplary embodiment, the first decoding parameter updated according to the first error evaluation information may be more compliant with a threshold voltage distribution state of the first memory cell currently belonging to the first voltage interval, thereby improving the decoding success rate of the data read from the first physical unit in the future. In addition, in an exemplary embodiment, obtaining the first error evaluation information according to the first data and the second data and updating the first decoding parameter according to the first error evaluation information can skip (that is, not execute) a cumbersome operation of real-time scanning of the threshold voltage distribution of the first memory cell, thereby effectively improving the updating efficiency of the first decoding parameter without increasing the system burden as much as possible.

Figure 10:
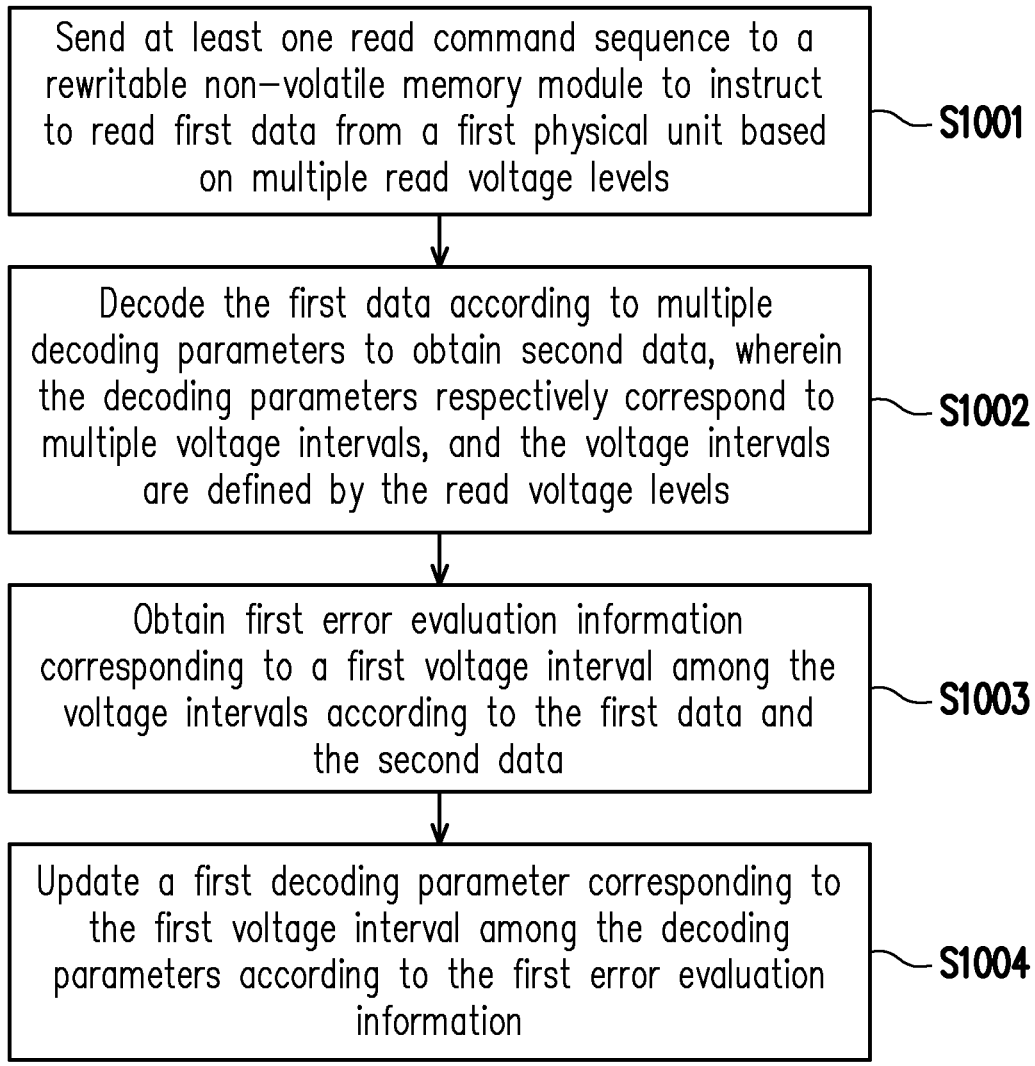
FIG. 10 is a flowchart of a decoding parameter updating method according to an exemplary embodiment of the disclosure.

FIG. 10 is a flowchart of a decoding parameter updating method according to an exemplary embodiment of the disclosure. Please refer to FIG. 10. In Step S1001, at least one read command sequence is sent to a rewritable non-volatile memory module to instruct to read first data from a first physical unit based on multiple read voltage levels. In Step S1002, the first data is decoded according to multiple decoding parameters to obtain second data, wherein the decoding parameters respectively correspond to multiple voltage intervals, and the voltage intervals are defined by the read voltage levels. In Step S1003, first error evaluation information corresponding to a first voltage interval among the voltage intervals is obtained according to the first data and the second data. In Step S1004, a first decoding parameter corresponding to the first voltage interval among the decoding parameters is updated according to the first error evaluation information.

However, each step in FIG. 10 has been described in detail above and will not be described again here. It is worth noting that each step in FIG. 10 may be implemented by multiple program codes or circuits, which are not limited by the disclosure. In addition, the method of FIG. 10 may be used in conjunction with the above exemplary embodiments or may be used alone, which is not limited by the disclosure.

In summary, the decoding parameter updating method, the memory storage device, and the memory control circuit unit provided by the disclosure can improve the decoding success rate of the data read from the first physical unit in the future through dynamically updating the first decoding parameter corresponding to the first voltage interval. In addition, the decoding parameter updating method, the memory storage device, and the memory control circuit unit provided by the disclosure can effectively improve the updating efficiency of the first decoding parameter without increasing the system burden as much as possible.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A decoding parameter updating method, used for a rewritable non-volatile memory module, wherein the rewritable non-volatile memory module comprises a plurality of physical units, the decoding parameter updating method comprising:
    sending at least one read command sequence to the rewritable non-volatile memory module to instruct to read first data from a first physical unit among the physical units based on a plurality of read voltage levels;
    decoding the first data according to a plurality of decoding parameters to obtain second data after reading the first data from the first physical unit, wherein the decoding parameters respectively correspond to a plurality of voltage intervals, and the voltage intervals are defined by the read voltage levels;
    obtaining first error evaluation information corresponding to a first voltage interval among the voltage intervals according to the first data and the second data; and
    updating a first decoding parameter corresponding to the first voltage interval among the decoding parameters according to the first error evaluation information.

2. The decoding parameter updating method according to claim 1, wherein the first decoding parameter is dedicated to decoding data read from a plurality of first memory cells in the first physical unit, and threshold voltages of the first memory cells are all located in the first voltage interval.

3. The decoding parameter updating method according to claim 1, wherein the first data comprises target data read from a plurality of first memory cells in the first physical unit, threshold voltages of the first memory cells are all located in the first voltage interval, and the first error evaluation information reflects a total number of at least one error bit in the target data.

4. The decoding parameter updating method according to claim 1, wherein the first data comprises target data read from a plurality of first memory cells in the first physical unit, threshold voltages of the first memory cells are all located in the first voltage interval, and the first error evaluation information reflects a bit error rate of the target data.

5. The decoding parameter updating method according to claim 1, wherein the first data comprises a first data sequence, the second data comprises a second data sequence, and obtaining the first error evaluation information corresponding to the first voltage interval among the voltage intervals according to the first data and the second data comprises:
    performing a logical operation on the first data sequence and the second data sequence; and
    obtaining the first error evaluation information according to a result of the logical operation, wherein the result of the logical operation reflects a position of at least one error bit in the first data sequence.

6. The decoding parameter updating method according to claim 1, wherein updating the first decoding parameter corresponding to the first voltage interval among the decoding parameters according to the first error evaluation information comprises:
   calculating the first decoding parameter according to a following equation:

$$LLR(i) = \ln\left(\frac{BER(i)}{1 - BER(i)}\right)$$

where LLR(i) represents the first decoding parameter, BER(i) represents the first error evaluation information, and ln( ) represents a natural logarithm function.

7. The decoding parameter updating method according to claim 1, wherein updating the first decoding parameter corresponding to the first voltage interval among the decoding parameters according to the first error evaluation information comprises:
   updating target error evaluation information according to the first error evaluation information, wherein the target error evaluation information reflects a changing trend of the first error evaluation information; and
   updating the first decoding parameter according to the target error evaluation information.

8. The decoding parameter updating method according to claim 1, wherein updating the first decoding parameter corresponding to the first voltage interval among the decoding parameters according to the first error evaluation information comprises:
   updating the first decoding parameter according to the first error evaluation information and at least one environmental parameter, wherein the at least one environmental parameter comprises at least one of a program count, an erase count, a read count, and a temperature value.

9. The decoding parameter updating method according to claim 1, wherein the first voltage interval corresponds to a plurality of candidate decoding parameters, the decoding parameter updating method further comprising:
   updating at least one of the candidate decoding parameters according to the first decoding parameter;
   selecting one of the candidate decoding parameters according to offset information of a target read voltage; and
   providing a selected decoding parameter to a decoding circuit.

10. A memory storage device, comprising:
   a connection interface unit, used to couple to a host system;
   a rewritable non-volatile memory module, wherein the rewritable non-volatile memory module comprises a plurality of physical units; and
   a memory control circuit unit, coupled to the connection interface unit and the rewritable non-volatile memory module,
   wherein the memory control circuit unit is used to:
      send at least one read command sequence to the rewritable non-volatile memory module to instruct to read first data from a first physical unit among the physical units based on a plurality of read voltage levels;
      decode the first data according to a plurality of decoding parameters to obtain second data after reading the first data from the first physical unit, wherein the decoding parameters respectively correspond to a plurality of voltage intervals, and the voltage intervals are defined by the read voltage levels;
      obtain first error evaluation information corresponding to a first voltage interval among the voltage intervals according to the first data and the second data; and
      update a first decoding parameter corresponding to the first voltage interval among the decoding parameters according to the first error evaluation information.

11. The memory storage device according to claim 10, wherein the first decoding parameter is dedicated to decoding data read from a plurality of first memory cells in the first physical unit, and threshold voltages of the first memory cells are all located in the first voltage interval.

12. The memory storage device according to claim 10, wherein the first data comprises target data read from a plurality of first memory cells in the first physical unit, threshold voltages of the first memory cells are all located in the first voltage interval, and the first error evaluation information reflects a total number of at least one error bit in the target data.

13. The memory storage device according to claim 10, wherein the first data comprises target data read from a plurality of first memory cells in the first physical unit, threshold voltages of the first memory cells are all located in the first voltage interval, and the first error evaluation information reflects a bit error rate of the target data.

14. The memory storage device according to claim 10, wherein the first data comprises a first data sequence, the second data comprises a second data sequence, and the memory control circuit unit obtaining the first error evaluation information corresponding to the first voltage interval among the voltage intervals according to the first data and the second data comprises:
   performing a logical operation on the first data sequence and the second data sequence; and
   obtaining the first error evaluation information according to a result of the logical operation, wherein the result of the logical operation reflects a position of at least one error bit in the first data sequence.

15. The memory storage device according to claim 10, wherein the memory control circuit unit updating the first decoding parameter corresponding to the first voltage interval among the decoding parameters according to the first error evaluation information comprises:
   calculating the first decoding parameter according to a following equation:

$$LLR(i) = \ln\left(\frac{BER(i)}{1 - BER(i)}\right)$$

where LLR(i) represents the first decoding parameter, BER(i) represents the first error evaluation information, and ln( ) represents a natural logarithm function.

16. The memory storage device according to claim 10, wherein the memory control circuit unit updating the first decoding parameter corresponding to the first voltage interval among the decoding parameters according to the first error evaluation information comprises:
   updating target error evaluation information according to the first error evaluation information, wherein the target error evaluation information reflects a changing trend of the first error evaluation information; and
   updating the first decoding parameter according to the target error evaluation information.

17. The memory storage device according to claim 10, wherein the memory control circuit unit updating the first decoding parameter corresponding to the first voltage interval among the decoding parameters according to the first error evaluation information comprises:

updating the first decoding parameter according to the first error evaluation information and at least one environmental parameter, wherein the at least one environmental parameter comprises at least one of a program count, an erase count, a read count, and a temperature value.

18. The memory storage device according to claim 10, wherein the first voltage interval corresponds to a plurality of candidate decoding parameters, and the memory control circuit unit is further used to:

update at least one of the candidate decoding parameters according to the first decoding parameter;

select one of the candidate decoding parameters according to offset information of a target read voltage; and provide a selected decoding parameter to a decoding circuit.

19. A memory control circuit unit, used to control a rewritable non-volatile memory module, wherein the rewritable non-volatile memory module comprises a plurality of physical units, the memory control circuit unit comprising:

a host interface, used to couple to a host system;

a memory interface, used to couple to the rewritable non-volatile memory module;

a decoding circuit; and a memory management circuit, coupled to the host interface, the memory interface, and the decoding circuit, wherein the memory management circuit is used to send at least one read command sequence to the rewritable non-volatile memory module to instruct to read first data from a first physical unit among the physical units based on a plurality of read voltage levels, the decoding circuit is used to decode the first data according to a plurality of decoding parameters to obtain second data after reading the first data from the first physical unit, wherein the decoding parameters respectively correspond to a plurality of voltage intervals, and the voltage intervals are defined by the read voltage levels, the memory management circuit is further used to obtain first error evaluation information corresponding to a first voltage interval among the voltage intervals according to the first data and the second data, and the memory management circuit is further used to update a first decoding parameter corresponding to the first voltage interval among the decoding parameters according to the first error evaluation information.

20. The memory control circuit unit according to claim 19, wherein the first decoding parameter is dedicated to decoding data read from a plurality of first memory cells in the first physical unit, and threshold voltages of the first memory cells are all located in the first voltage interval.

21. The memory control circuit unit according to claim 19, wherein the first data comprises target data read from a plurality of first memory cells in the first physical unit, threshold voltages of the first memory cells are all located in the first voltage interval, and the first error evaluation information reflects a total number of at least one error bit in the target data.

22. The memory control circuit unit according to claim 19, wherein the first data comprises target data read from a plurality of first memory cells in the first physical unit, threshold voltages of the first memory cells are all located in the first voltage interval, and the first error evaluation information reflects a bit error rate of the target data.

23. The memory control circuit unit according to claim 19, wherein the first data comprises a first data sequence, the second data comprises a second data sequence, and the memory management circuit obtaining the first error evaluation information corresponding to the first voltage interval among the voltage intervals according to the first data and the second data comprises:

performing a logical operation on the first data sequence and the second data sequence; and obtaining the first error evaluation information according to a result of the logical operation, wherein the result of the logical operation reflects a position of at least one error bit in the first data sequence.

24. The memory control circuit unit according to claim 19, wherein the memory management circuit updating the first decoding parameter corresponding to the first voltage interval among the decoding parameters according to the first error evaluation information comprises:

calculating the first decoding parameter according to a following equation:

$$LLR(i) = \ln\left(\frac{BER(i)}{1 - BER(i)}\right)$$

where LLR(i) represents the first decoding parameter, BER(i) represents the first error evaluation information, and ln( ) represents a natural logarithm function.

25. The memory control circuit unit according to claim 19, wherein the memory management circuit updating the first decoding parameter corresponding to the first voltage interval among the decoding parameters according to the first error evaluation information comprises:

updating target error evaluation information according to the first error evaluation information, wherein the target error evaluation information reflects a changing trend of the first error evaluation information; and updating the first decoding parameter according to the target error evaluation information.

26. The memory control circuit unit according to claim 19, wherein the memory management circuit updating the first decoding parameter corresponding to the first voltage interval among the decoding parameters according to the first error evaluation information comprises:

updating the first decoding parameter according to the first error evaluation information and at least one environmental parameter, wherein the at least one environmental parameter comprises at least one of a program count, an erase count, a read count, and a temperature value.

27. The memory control circuit unit according to claim 19, wherein the first voltage interval corresponds to a plurality of candidate decoding parameters, and the memory management circuit is further used to:

update at least one of the candidate decoding parameters according to the first decoding parameter;

select one of the candidate decoding parameters according to offset information of a target read voltage; and provide a selected decoding parameter to the decoding circuit.

* * * * *